US 6,711,114 B2

(12) United States Patent
Tanaka et al.

(10) Patent No.: US 6,711,114 B2
(45) Date of Patent: Mar. 23, 2004

(54) DISC TRANSFER APPARATUS WITH TOGGLE MECHANISM

(75) Inventors: Shinsaku Tanaka, Tokyo (JP); Takashi Yamanaka, Tokyo (JP)

(73) Assignee: Tanashin Denki Co., Ltd., Tokyo (JP)

( * ) Notice: Subject to any disclaimer, the term of this patent is extended or adjusted under 35 U.S.C. 154(b) by 171 days.

(21) Appl. No.: 10/054,923

(22) Filed: Jan. 25, 2002

(65) Prior Publication Data

US 2002/0126613 A1 Sep. 12, 2002

(30) Foreign Application Priority Data

Sep. 3, 2001 (JP) .................................... 2001-265196

(51) Int. Cl.[7] ............................................. G11B 33/02
(52) U.S. Cl. ..................................................... 369/77.1
(58) Field of Search ............................ 369/77.1, 191, 369/30.32, 30.48, 30.6, 30.9, 30.94; 360/99.02, 99.06, 99.07

(56) References Cited

U.S. PATENT DOCUMENTS

| 4,612,591 A | 9/1986 | Tanaka et al. ............. 360/93 |
| 4,733,387 A | 3/1988 | Yoshimura ................. 369/77.1 |
| 6,084,832 A | 7/2000 | Furusawa et al. ......... 369/30.85 |
| 6,084,838 A | 7/2000 | Tanaka et al. ............. 369/77.1 |
| 6,141,310 A | 10/2000 | Tanaka et al. ............. 369/75.2 |
| 6,147,948 A | 11/2000 | Tanaka et al. ............. 369/77.1 |
| 6,169,719 B1 | 1/2001 | Yamanaka et al. ......... 369/75.1 |
| 6,192,019 B1 | 2/2001 | Kurokawa et al. ......... 369/77.1 |
| 6,198,713 B1 | 3/2001 | Sakurai et al. ............. 369/77.1 |
| 6,201,782 B1 | 3/2001 | Tanaka et al. ............. 369/270 |
| 6,330,216 B1 | 12/2001 | Nishimura et al. ........ 369/77.1 |
| 2001/0053116 A1 | 12/2001 | Sato .......................... 369/77.1 |
| 2002/0015375 A1 | 2/2002 | Tanaka et al. ............. 369/77.1 |

FOREIGN PATENT DOCUMENTS

| EP | 0997897 A2 | * 5/2000 |
| JP | 11-86401 A | * 3/1999 |

* cited by examiner

Primary Examiner—Julie Anne Watko
(74) Attorney, Agent, or Firm—Reed Smith LLP; Stanley P. Fisher, Esq.; Juan Carlos A. Marquez, Esq.

(57) ABSTRACT

A disc transfer apparatus, which relies on a spring force for inserting a disc and on a motor for removing the disc, is provided to prevent the motor from acting as a load when the disc is inserted. A holding mechanism is provided in the disc transfer apparatus for holding a control gear included in a power transmission path (from a two-way motor for moving a pickup and for moving a push-back member), with respect to an upstream gear and a downstream gear without meshing therewith. The control gear is released from the holding mechanism by ejecting means.

23 Claims, 13 Drawing Sheets

DISC TRANSFER APPARATUS WITH TOGGLE MECHANISM

BACKGROUND OF THE INVENTION

1. Field of the Invention

The present invention relates an improvement in a disc transfer apparatus which relies on a spring force for inserting a disc and on a motor for removing the disc.

2. Description of the Related Art

Generally, in a disc transfer apparatus, it is desired to rapidly insert a disc but relatively slowly remove the disc to prevent the disc from rushing out. Laid-open Japanese Patent Application No. 11-86401 shows a disc transfer apparatus which comprises a spring-based toggle mechanism in a disc transfer unit such that a disc is rapidly inserted with the spring force of the toggle mechanism while the disc is removed relatively slowly with the power of a motor.

Specifically, a push-back member is coupled with a push-in member, and the push-back member is urged by the toggle mechanism to be pivotally moved in two opposite directions from a neutral position defined and limited by the toggle mechanism. When a disc is inserted, the push-back member is pushed by the disc for insertion. As the push-back member and goes beyond the neutral position defined by the toggle mechanism, the push-in member is triggered and follows the push-back mechanism to push the disc into a playing position with a spring force. In this event, if a motor acts as a load during the insertion of the disc, the disc cannot be lightly inserted. As such, a power transmission path from the motor to the push-back member is cut off when the disc is inserted to lightly insert the disc. On the other hand, a disc removal operation causes the motor to start to connect the power transmission path by a rotating force of the motor to pivotally move the push-back member to push back the disc.

The disclosed apparatus employs a dedicated disc transfer motor which is driven only in a "disc removal operation." Therefore, if the motor is driven other than the disc removal operation, the power transmission path will be unintentionally connected by the rotating force of the motor, which causes the push-back member to push back the disk. In other words, the disc player disclosed in Laid-open Japanese Patent Application No. 11-86401 experiences trouble in that if the disc transfer motor is used as a motor for moving a pickup (for simplifying the structure of the apparatus and reducing the manufacturing cost), the power transmission path is unintentionally connected from the motor to the push-back member when the pickup is to be moved. Therefore, a disc is pushed back by the push-back member during a playback operation.

SUMMARY OF THE INVENTION

The present invention has been made to solve the problem as mentioned above, and it is an object of the invention to provide a disc transfer apparatus which relies on a spring force to insert a disc, and on a motor for moving a pickup thereby removing the disc. Accordingly, the structure is simplified and the manufacturing cost of the disc transfer apparatus is reduced.

A disc transfer apparatus according to the present invention couples a push-back member with a push-in member such that the push-back member is pivoted in one direction to push back a disc and the push-in member pushes the disc into a playing position following the pivotal movement of the push-back member in the other direction. A toggle mechanism is also provided for urging the push-back member for bi-directional pivotal movements. The power of a two way motor in one direction is transmitted to the push-back member through a transmission mechanism.

The transmission mechanism includes a control gear, and an upstream gear and a downstream gear in mesh with the control gear upstream and downstream of a power transmission path, respectively. When the push-back member is pivoted in the opposite direction, the control gear is held without meshing with the upstream gear and the downstream gear so as to insert the disc is inserted with a spring force. When the disc is removed, the control gear is released from the holding mechanism by ejecting means and brought into mesh with the upstream gear and the downstream gear so as to remove the disc by the power of the motor.

When the control gear is comprised of two coaxially integrated toothless gears, and these toothless gears are simultaneously placed opposite to the upstream and downstream gears, respectively, the structure of the apparatus can be simplified.

The structure can be further simplified by forming the push-back member with an angle cam to which a cam follower is resiliently pressed to provide the toggle mechanism, and selectively positioning the cam follower on one of the inclines of the angle cam from its peak to urge the push-back member for bidirectional pivotal movements.

Alternatively, a toggle spring may be extended between the push-back member and a floating chassis to constitute the toggle mechanism to further simplify the structure.

In the apparatus, to control movement of a chucking mechanism into contact with and away from a turntable by a cam member which is reciprocally movably associated with the pivotal movements of the push-back member, the cam member is provided with a plurality of steps on a cam face such that the chucking mechanism is moved step by step into contact with and away from a turntable to prevent shock in a chucking operation.

Further, when a sliding mechanism is interposed in the power transmission path for absorbing an overload, the sliding mechanism generates slippage to absorb the overload even if the removal of a disc is forcedly stopped, which prevents the motor from moving the pickup or the like from damaging.

BRIEF DESCRIPTION OF THE DRAWINGS

The foregoing and additional features and characteristics of the present invention will become more apparent from the following detailed description considered with reference to the accompanying drawings in which like reference numerals designate like elements and wherein.

DETAILED DESCRIPTION OF THE PREFERRED EMBODIMENT

FIGS. 1 through 11 illustrate a disc transfer apparatus according to a first embodiment of the present invention.

Figure 1:
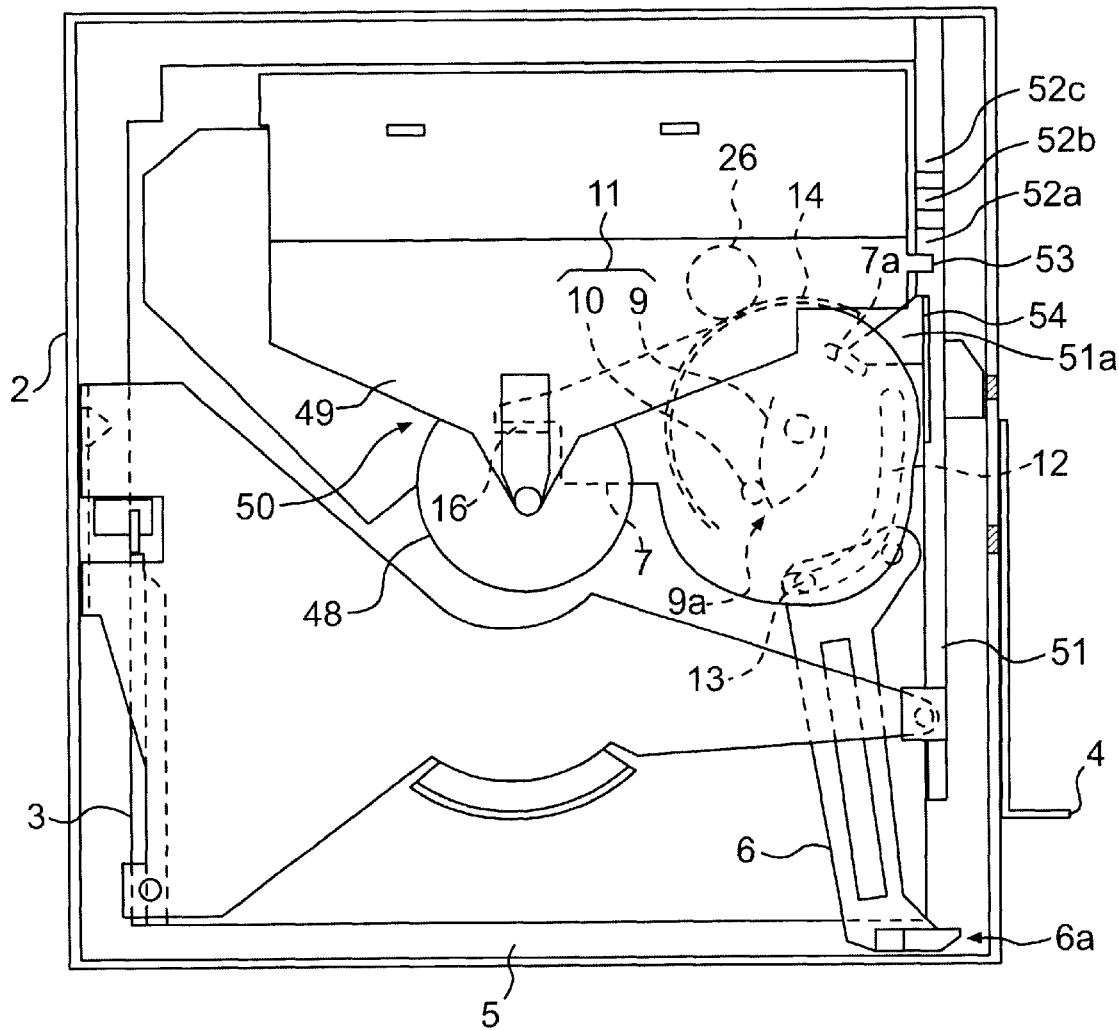
FIG. 1 is a plan view generally illustrating a disc transfer apparatus according to a first embodiment of the present invention before a disc is inserted.
Figure 2:
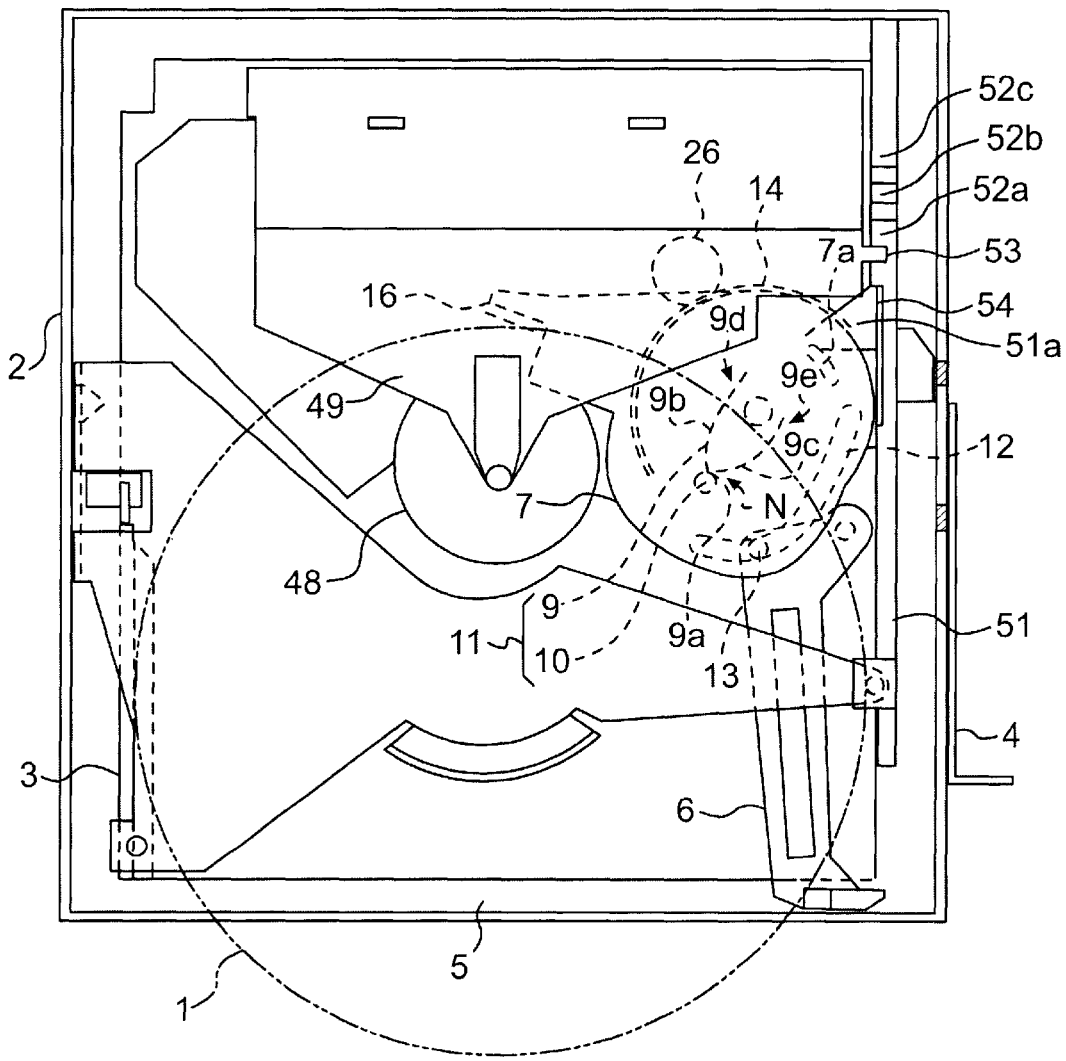
FIG. 2 is a plan view generally illustrating the disc transfer apparatus of FIG. 1 when a disc is being inserted.
Figure 3:
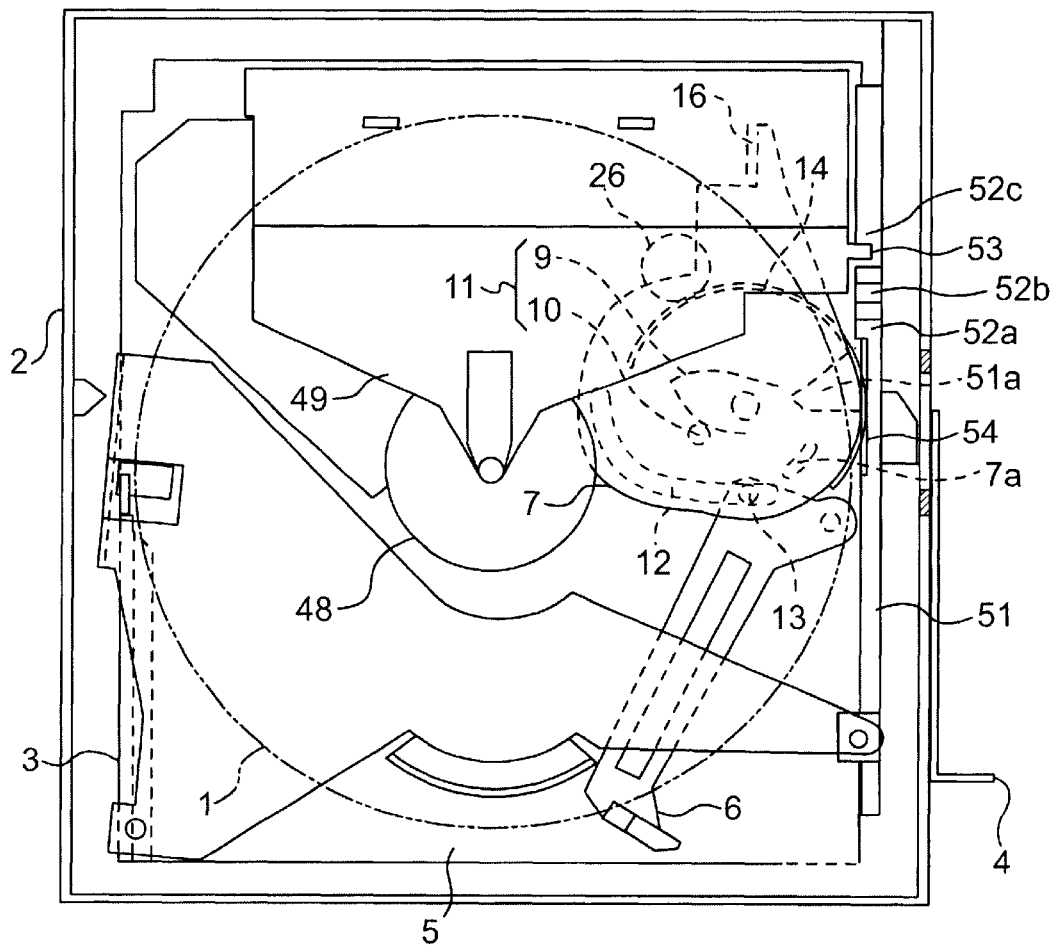
FIG. 3 is a plan view generally illustrating the disc transfer apparatus of FIG. 1 when the disc is loaded therein.

FIGS. 1 through 3 are plan views generally illustrating a mechanism of the disc transfer apparatus, wherein FIG. 1 illustrates a state before a disc is inserted; FIG. 2 illustrates when a disc 1 is being inserted; and FIG. 3 illustrates when the disc 1 is loaded at a playing position. In a player body 2, a floating chassis 3 is resiliently supported in a floating state with respect to the body 2. Ejecting means, i.e., an eject lever 4 is mounted on an outer side of the body 2 such that the eject lever 4 is permitted to advance and retract.

The floating chassis 3 is provided with a push-in member 6 pivotally arranged for pushing from a waiting position 6a the disc 1 inserted from a disc insertion port 5 into a playing position, and a push-back member 7 pivotally arranged for pushing the disc 1 back from the playing position to the insertion port 5, respectively. The push-back member 7 is formed with an angle cam 9 near the axis of its pivotal movement. This angle cam 9 and a cam follower 10, which is to be pressed onto the outer surface of the angle cam 9 by a spring force constitute a toggle mechanism 11. The cam follower 10 selectively presses one of the inclines 9b, 9c on both sides 9d, 9e of the angle cam 9 from a neutral position N at which the cam follower 10 is in contact with the peak 9a of the angle cam 9 to urge the push-back member 7 in one or the other direction from the neutral position N.

The push-back member 7 has a curved cam groove 12, and the push-in member 6 has a cam pin 13 which interacts with the cam groove 12 by being inserted therein. The push-back member 7 is also formed with a large gear 14 concentrically therewith which is preferably larger than all other gears in the apparatus. The push-back member 7 pushes the disc 1 from the playing position to the insertion port 5 with its push-back portion 16 at its leading end thereof.

Referring to FIGS. 1 through 4, the floating chassis 3 is provided on its rear surface with a pickup supporter 18 for supporting a pickup 17, a two-way motor 19 for moving the pickup 17, gears 20–24, a control gear 25, a gear 26, a holding mechanism 27 substantially in the shape of a cross, and first, second and third control switches 28, 29, 30; etc.

The gear 20 is coaxially integrated with a worm wheel 20a and a gear 20b having a diameter smaller than the worm wheel 20a. The worm wheel 20a is meshed with a worm gear 31 mounted to a rotating shaft of the motor 19.

The gears 21, 22 are coaxially arranged with a friction plate 32 (made of felt or the like) interposed therebetween. Then, the gear 21, which is larger than the gear 22, meshes with the gear 20b, such that when a load on the smaller gear 22 exceeds a set value, slippage is generated between the friction plate 32 and the gear 21 or 22 to limit the magnitude of power transmitted to the gear 22.

Likewise, the gears 23, 24 are coaxially arranged with a friction plate 33 (made of felt or the like) interposed therebetween. Then, the gear 23, which is larger than the gear 24, meshes the gear 21, such that when a load on the gear 24 exceeds a set value, slippage is generated between the friction plate 33 and the gear 23 or 24 to limit the magnitude of power transmitted to the gear 24. The gear 24 meshes with a rack mounted on the pickup supporter 18 to transmit the power of the motor 19 to the pickup supporter 18, which causes the pickup 17 to move in a linear fashion.

The control gear 25 is comprised by coaxially integrating large and small toothless gears 35, 36 and a switch control cam plate 37. The control gear 25 is provided with a first and a second engaged portions such that when an engaging portion 27a formed at a first arm leading end of the holding mechanism 27 engages with either of the engaged portions 38, 39, a toothless portion 35a of the large toothless gear 35 and a toothless portion 36a of the small toothless gear 36 simultaneously disassociate/oppose the gears 22, 26, respectively, so that the toothless gear 35 and gear 22 as well as the toothless gear 36 and gear 26 are held without meshing with each other.

The gear 22 meshes with the control gear 25 in the upstream of the power transmission path, so that the gear 22 is also called the "upstream gear," while the gear 26 meshes with the control gear 25 in the downstream of the power transmission path so that the gear 26 is also called the "downstream gear." The downstream gear 26 is at all times in mesh with the large gear 14 which is arranged in a portion of the winding push-back member 7.

Figure 4:
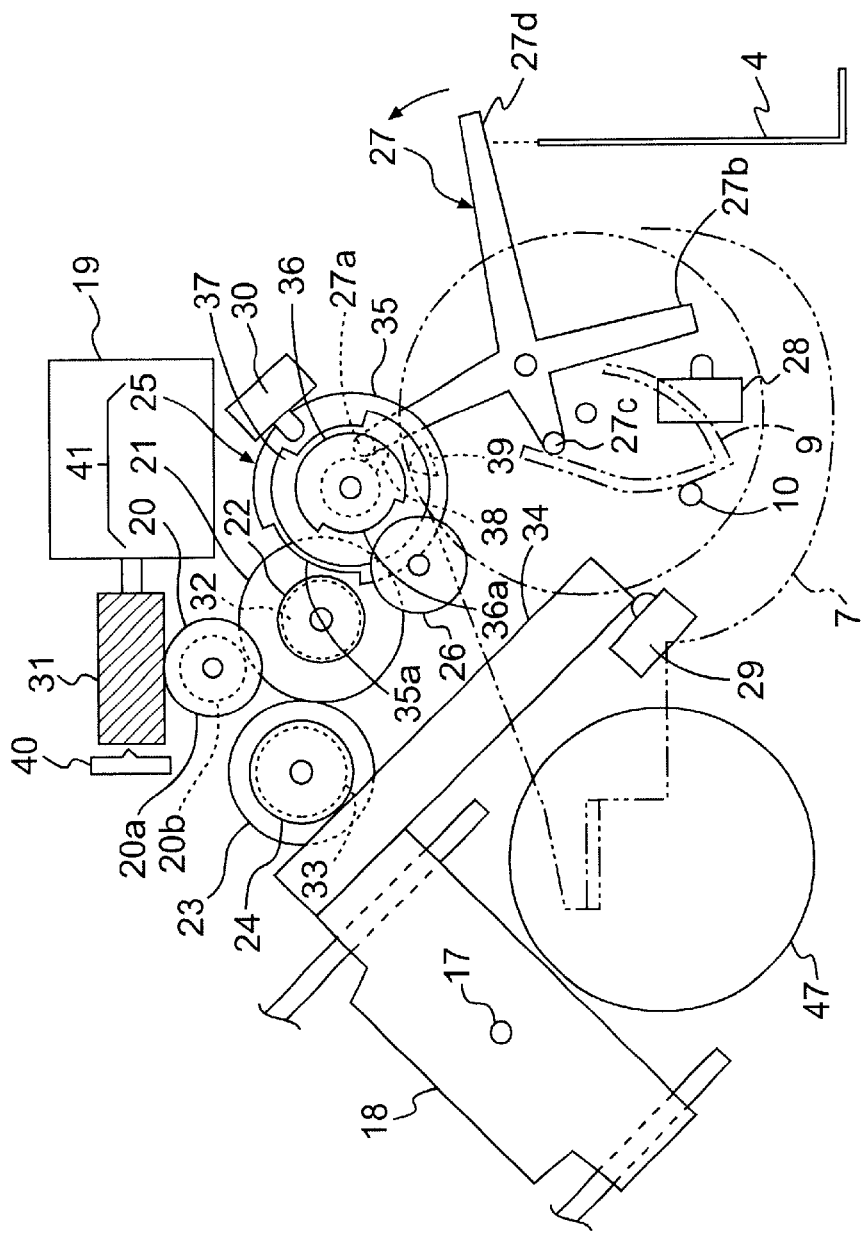
FIG. 4 is a plan view generally illustrating the structure of a transmission mechanism and associated parts in its surroundings.

The first control switch 28 is pushed by a switch operating arm 27b of the holding mechanism 27 to turn on to generate a motor start signal when the disc 1 inserted from the insertion port 5 is transferred to the playing position. The second control switch 29 is pushed by the rack 34 to turn on to generate a pickup position detection signal when the pickup 17 is in a lead-in area of the disc 1. The third control switch 30 is pushed by a switch control cam plate 37 to turn on to generate a motor stop signal when the disc 1 is pushed back to a position at which the disc 1 can be removed from the insertion port 5. In FIG. 4, reference numeral 40 designates a movement restricting member for restricting an axial movement of the worm gear 31.

A transmission mechanism 41 comprises the gears 20, 32, the upstream gear 22, the control gear 25, and the downstream gear 26. The transmission mechanism 41 transmits power from the motor 19 to the push-back member 7, i.e., a power transmission path. The large and small toothless gears 35, 36, forming parts of the control gear 25, respectively place the toothless portions 35a, 36a opposite to the upstream gear 22 and the downstream gear 26 when the engaging portion 27a of the holding mechanism 27 engages with the first engaged portion 38 to block the power being transmitted by the transmission mechanism 41. However, when the engaging portion 27a comes off the first engaged portion 38, the toothless gears 35, 36 slightly rotate in the counter-clockwise direction in FIG. 4 to simultaneously bring their respective toothed portions into mesh with the upstream gear 22 and downstream gear 26, respectively.

A cam pin 27c is arranged at a leading end of the second arm of the holding mechanism 27, and the cam pin 27c abuts to the inner wall surface of the angle cam 9. A leading end of the third arm of the holder mechanism 27 serves as a pushed portion 27d which is pushed by the eject lever 4.

Figure 5:
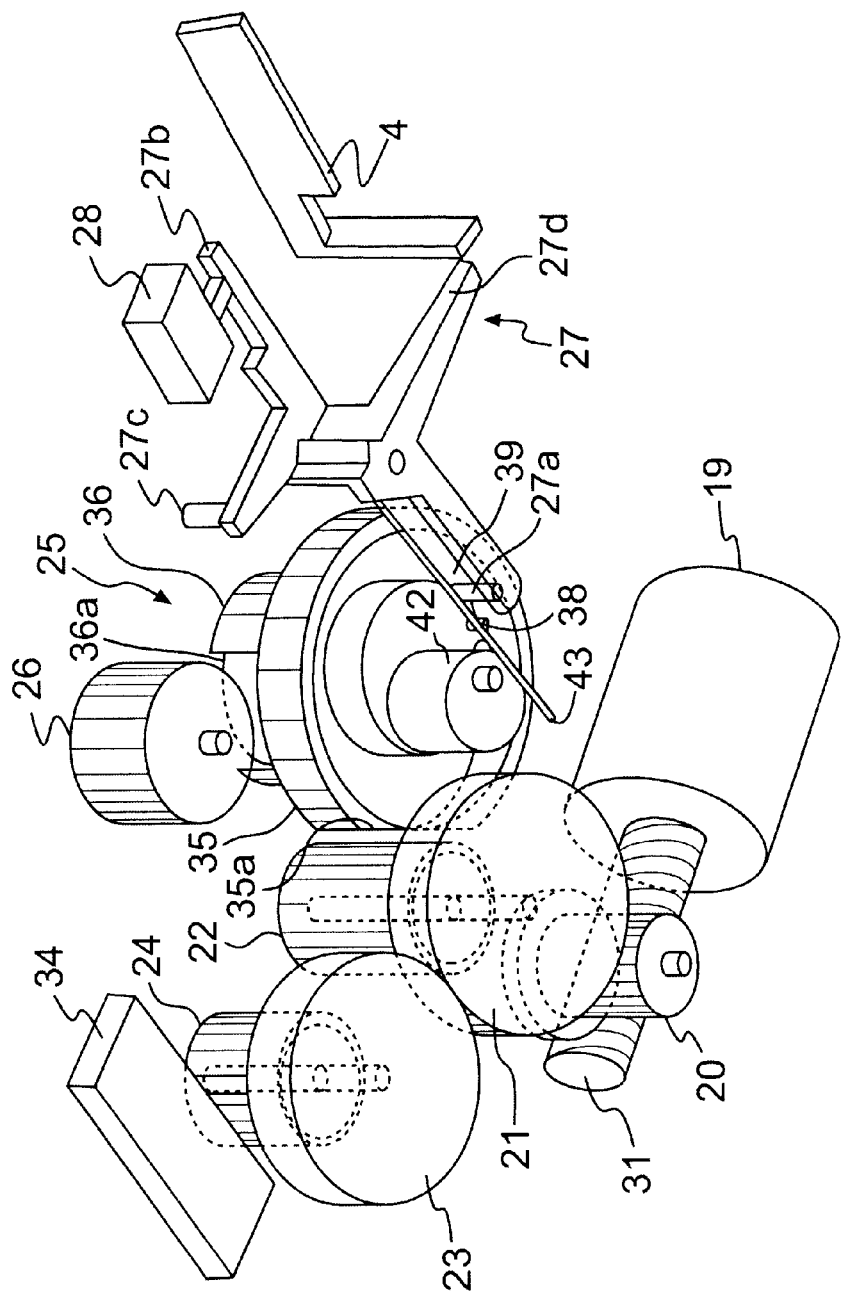
FIG. 5 is a general perspective view of the transmission mechanism viewed from below.

FIG. 5 is a perspective view of the control gear 25 and the associated parts in its surroundings from below. As illustrated in FIG. 5, an eccentric cylinder 42 is protrusively arranged on the lower surface of the large toothless gear 35 which forms part of the control gear 25. Then, a rod spring 43 is pressed onto the eccentric cylinder 42 to provide the control gear 25 with a pivotal force so as to bring the respective toothed portions of the toothless gears 35, 36 into mesh with the upstream gear 22 and downstream gear 26, respectively, when the engaging portion 27a of the holder mechanism 27 comes off the first or second engaged portions 38, 39.

The rod spring 43 is mounted to the pivot shaft of the holding mechanism 27 to urge the holding mechanism 27 at all times in the clockwise direction (indicated by an arrow) in FIG. 4. When the push-back member 7 is at a position to which the disc 1 is pushed back, the inner wall surface of the angle cam 9 abuts to the cam pin 27c to hold the engaging portion 27a at a position at which it engages with the first engaged portion 38.

Figure 6:
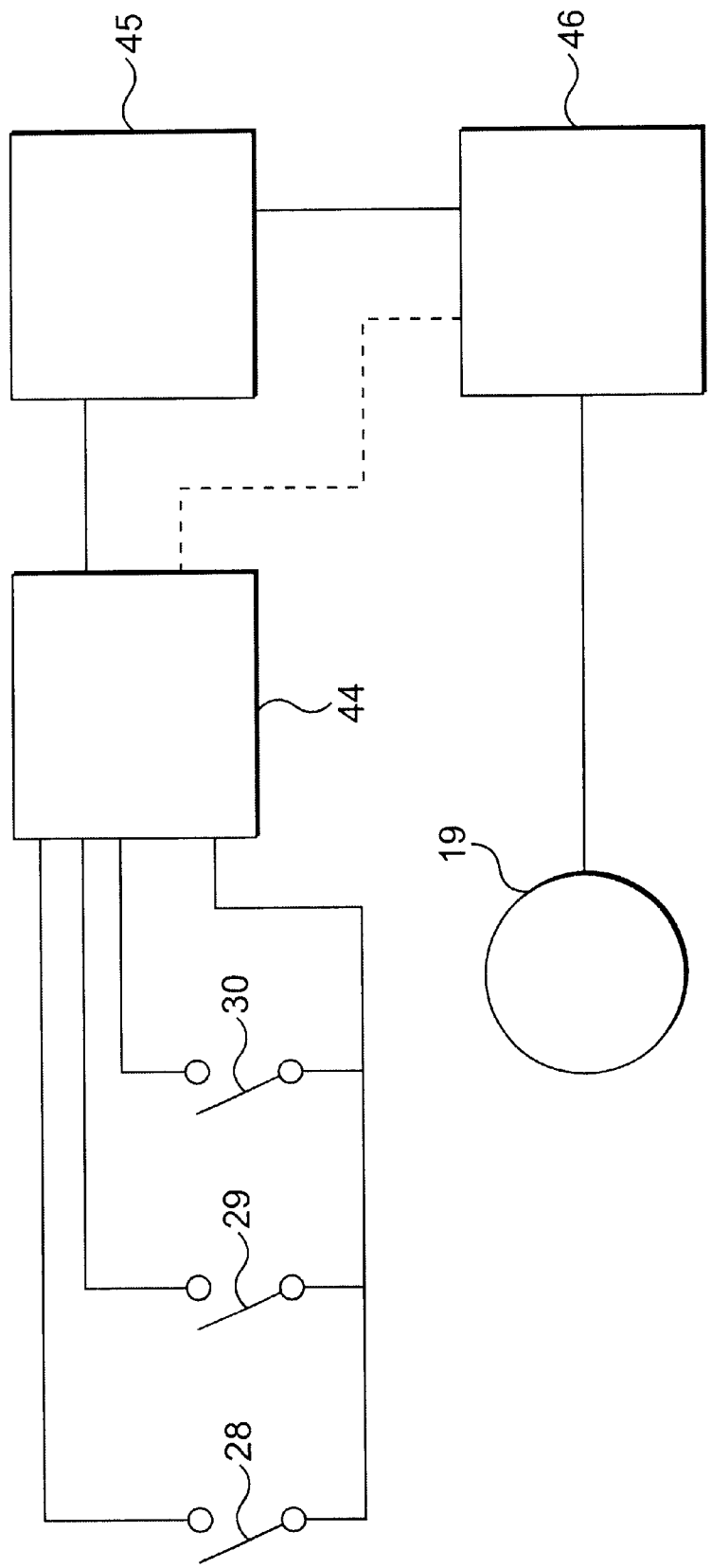
FIG. 6 is a schematic circuit diagram illustrates the configuration of a circuit for controlling the operation of a disc player.

FIG. 6 generally illustrates the configuration of a circuit for controlling the operation of a disc player. The illustrated circuit comprises a processor circuit 44 which receives signals from the first through third control switches 28, 29, 30 to determine an operating state of the disc player, a control circuit 45 which receives a signal from the processor circuit 45 to control playbacking of a disc, and a drive circuit 46 which receives a signal from the control circuit 45 to control the motor 19 for moving the pickup.

As the first control switch 28 is turned on, the processor circuit 44 operates the drive circuit 46 through the control circuit 45 to rotate the motor 19 in a forward direction. This causes the pickup 17 to move from the lead-in area of the disc 1 to the outer periphery. In this process, the control circuit 45 controls the pickup 17 to play a disc.

As the first control switch 28 is turned off, the processor circuit 44 operates the drive circuit 46 through the control circuit 45 to supply the motor 19 with a high voltage, which causes the motor 19 to rotate in a reverse direction at a high speed. This causes the pickup 17 to fast move to the lead-in area of the disc 1, and this also causes the control circuit 45 to stop the playback operation. Then, as the third control switch 30 is turned off, the motor 19 is stopped.

In FIG. 4, reference numeral 47 designates a turntable. Also, in FIGS. 1 through 3, reference numeral 48 designates a clamper disposed above the turntable 47. The clamper 48 is rotatably supported on a pivot end of a clamper supporting plate 49 which is vertically pivotally mounted to the floating chassis 3. The clamper 48 and clamper supporting plate 49 constitute a chucking mechanism 50. The clamper supporting plate 49 is urged downward at all times by a spring (not shown).

Figure 7:
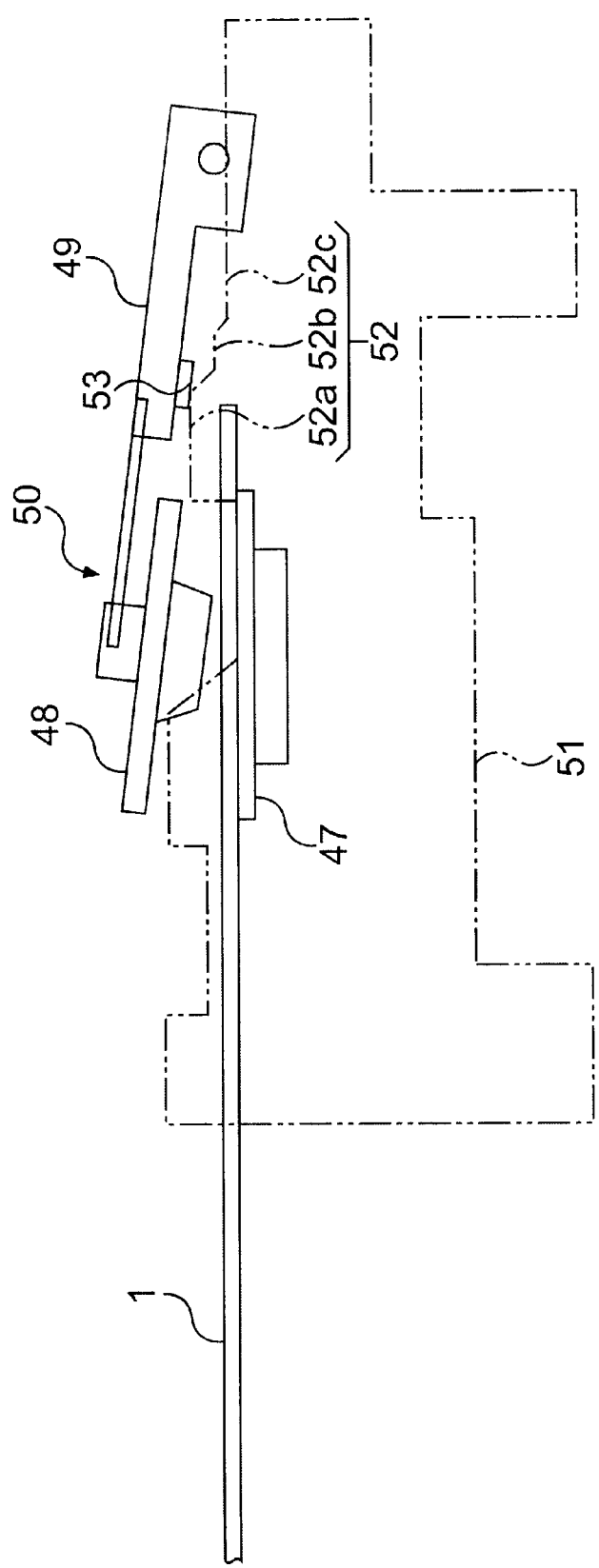
FIG. 7 is a side view generally illustrating the relationship between a checking mechanism and a cam member.
Figure 8:
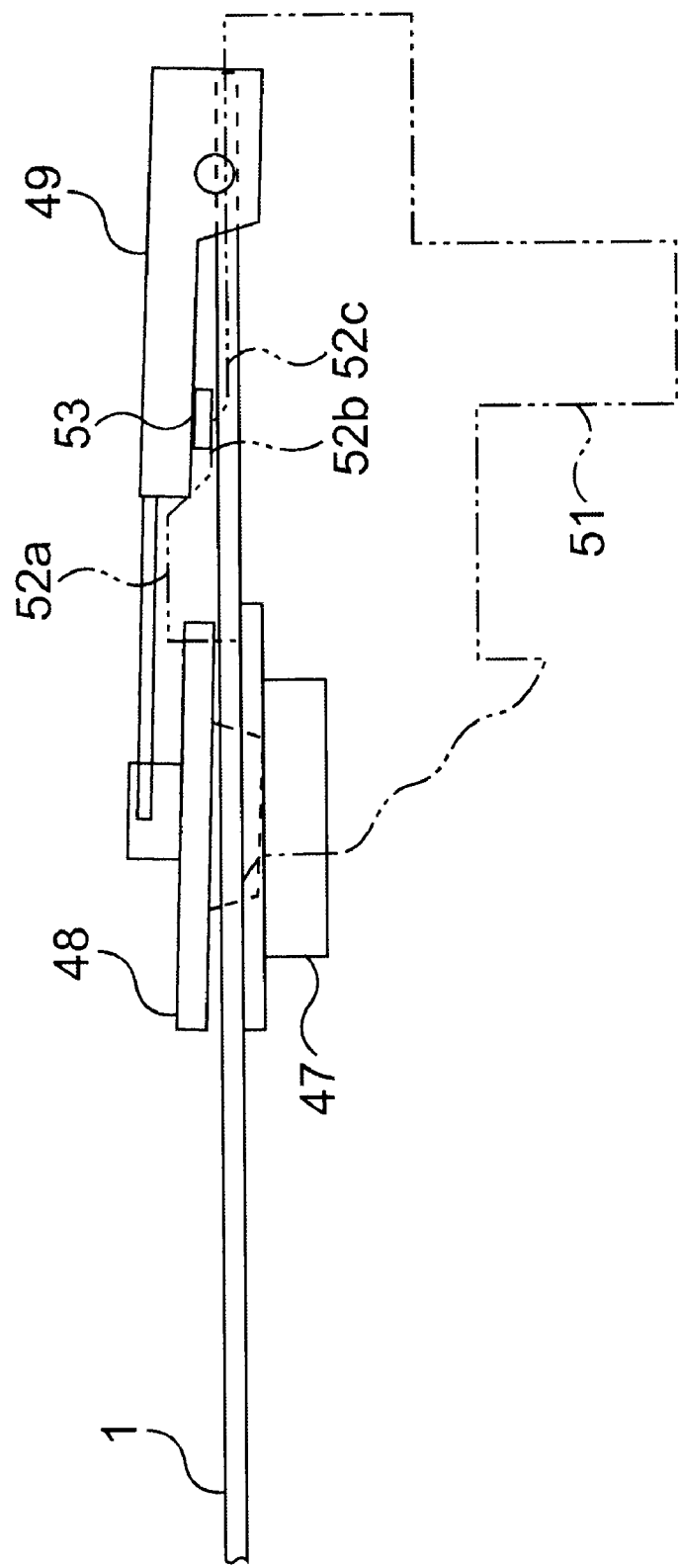
FIG. 8 is a side view generally illustrating the relationship between the checking mechanism and the cam member.
Figure 9:
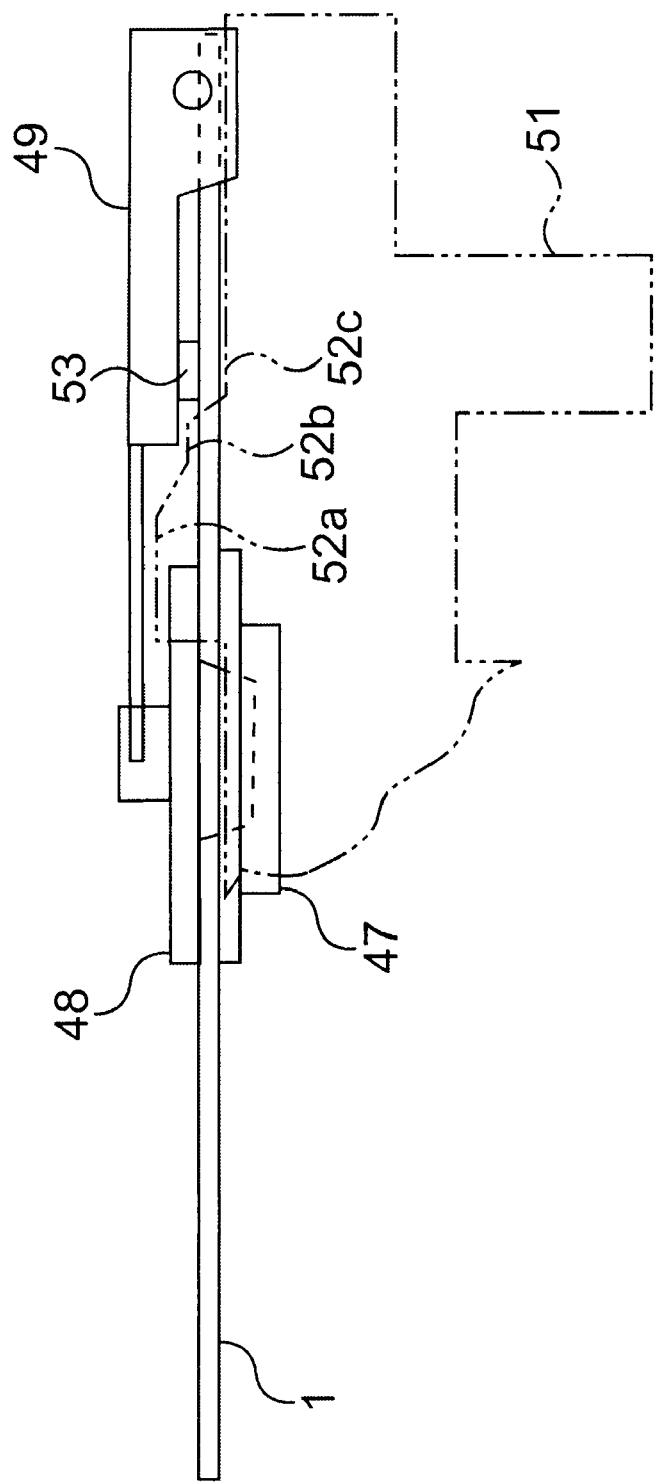
FIG. 9 is a side view generally illustrating the relationship between the checking mechanism and the cam member.

Also, as illustrated in FIGS. 1 through 3, the floating chassis 3 is provided with a cam member 51 arranged to be moved in the same direction in which the disc 1 is inserted and removed. The cam member 51 is urged in the direction of the insertion port 5 by a spring (not shown), and it has a cam face 52 formed in three steps on its top surface, as illustrated in FIGS. 7 through 9. On the other hand, the clamper supporting plate 49 has an abutment piece 53 on one edge thereof, such that the abutment piece 53 is selectively placed opposite to an upper step 52a, a middle step 52b or a lower step 52c of the cam face 52 in accordance with the position of the cam member 51.

Specifically, when the abutment piece 53 is pressed up by the upper step 52a of the cam face 52 as illustrated in FIG. 7, there is a space between the damper 48 and the turntable 47 through which the disc 1 can pass. When the abutment piece 53 abuts to the middle step 52b of the cam face 52 as illustrated in FIG. 8, the damper 48 is at a level at which a protrusion on its bottom surface is inserted into the center hole of the disc 1. When the abutment piece 53 opposes the lower step 52c of the cam face 52, the disc 1 is sandwiched between the damper 48 and the turntable 47.

The cam member 51 is also formed with a triangular plate 51a which is in engagement with a circular arc cam 7a formed in the push-back member 7. The circular arc cam 7a presses the triangular plate 51a to push back the cam member 51 by the operation of the push-back member 7 so as to push back the disc 1, and an arc face of the circular arc cam 7a engages with a leading end of the triangular plate 51a to maintain the cam member 51 at a pushed-back position. The cam member 51 further has a rack 54, as shown in FIGS. 1 through 3, which comes in mesh with the larger gear 14 of the push-back member 7 at an end point reached by the disc 1 when it is pushed into the playing position. Therefore, the cam member 51 is reciprocally movably associated with the pivotal movement of the push-back member 7 by the action of the circular arc cam 7a and the rack 54.

Next, the operation of the first embodiment is described.

Before a disc is inserted, the push-in member 6 and the push-back member 7 are at positions for accepting the disc 1, as illustrated in FIG. 1, the push-in member 6 being at the waiting position 6a. Also, the inner wall surface of the angle cam 9 abuts to the cam pin 27c to bring the engaging portion 27a of the holding mechanism 27 into engagement with the first engaged portion 38, and to place the respective toothless portions 35a, 36a of the toothless gears 35, 36, which form part of the control gear 25, opposite to (facing against) the upstream gear 22 and the downstream gear 26, respectively, so as to block the power transmission path of the transmission mechanism 41.

At this time, the first control switch 28 and third control switch 30 are turned off such that the motor 19 for moving the pickup is stopped, whereas the second control switch 29 is pushed by the rack 34 to turn on. The cam member 51 is maintained at the deepest position of the apparatus, to which the cam member 51 has been moved by the circular arc cam 7a, and the abutment piece 53 of the clamper supporting plate 49 is forced up to the upper step 52a of the cam face 52 so as to provide a space between the clamper 48 and the turntable 47 for the disc 1 to pass therethrough.

As the disc 1 is inserted from the disc insertion port 5 in this state, the push-back member 7 is pushed by the disc 1 to cause a pivotal movement in the clockwise direction. Associated therewith, the cam follower 10 is directed to the peak of the cam 9 along one incline of the angle cam 9. After the cam follower 10 goes over the peak of the angle cam 9 and proceeds to the other incline, the push-back member 7 is significantly pivoted in the clockwise direction by a spring force, i.e., a pressing force of the cam follower 10, which causes the inner wall surface of the angle cam 9 to move away from the cam pin 27c. Also, the push-in member 6 is pivoted in the clockwise direction associated with the push-back member 7, and pushes the disc 1 into the playing position. In this event, since the power transmission path from the motor 19 to the push-back member 7 is blocked, the motor 19 will not act as a load when the disc 1 is inserted.

Figure 10:
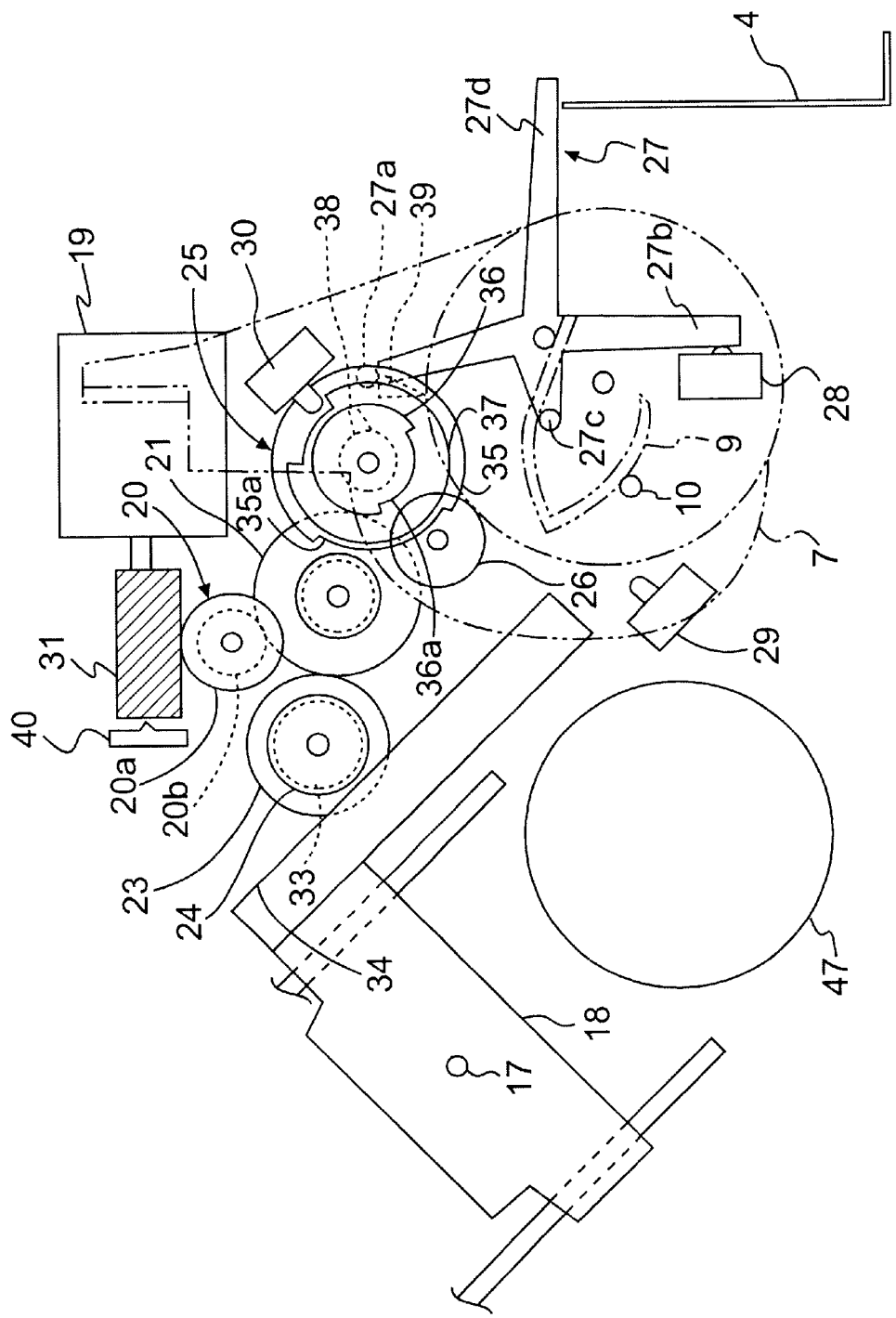
FIG. 10 is a plan view generally illustrating the transmission mechanism and associated parts in its surroundings in a playback operation.

As the inner wall surface of the angle cam 9 is moved away from the cam pin 27c, the holding mechanism 27 is released from the cam pin 27c, which has been pressing the holding mechanism 27, to pivot in the clockwise direction, such that the engaging portion 27a comes off the first engaged portion 38 and moves onto the trajectory of the second engaged portion 39. This causes the control gear 25 to rotate by a set amount in the counter-clockwise direction. However, before bringing the respective toothed portions of the toothless gears 35, 36 into mesh with the upstream gear 22 and the downstream gear 26, respectively, the second engaged portion 39 is abutted to the engaging portion 27a and stopped as illustrated in FIG. 10, so as to continuously block the power transmission path of the transmission mechanism 41.

The pivotal movement of the push-back member 7 in the clockwise direction causes the circular arc cam 7a to move away from the triangular plate 51a so as to permit the cam member 51 to move in front from the deepest position of the apparatus. Also, the larger gear 14 of the push-back member 7, in mesh with the rack 54 of the cam member 51, moves the cam member 51 in front from the deepest position of the apparatus. Then, when the center hole of the disc 1 moves substantially beneath the damper 48, the abutment piece 53 proceeds to the middle step 52b of the cam face 52, which causes the protrusion on the bottom surface of the damper 48 to be inserted into the center hole of the disc 1. Then, as the cam member 51 is further moved, the abutment piece 53 proceeds to the lower step 52c of the cam face 52 to sandwich the disc 1 between the damper 48 and the turntable 47.

Also, the first control switch 28 is pushed by the switch operating arm 27b to turn on, which causes the motor 19 for moving the pickup to rotate in the forward direction. The rotating force of the motor 19 is transmitted to the rack 34 through the gears 20, 21, 23, 24 to move the pickup 17 from the lead-in area of the disc 1 to the outer periphery for playing the disc 1.

Figure 11:
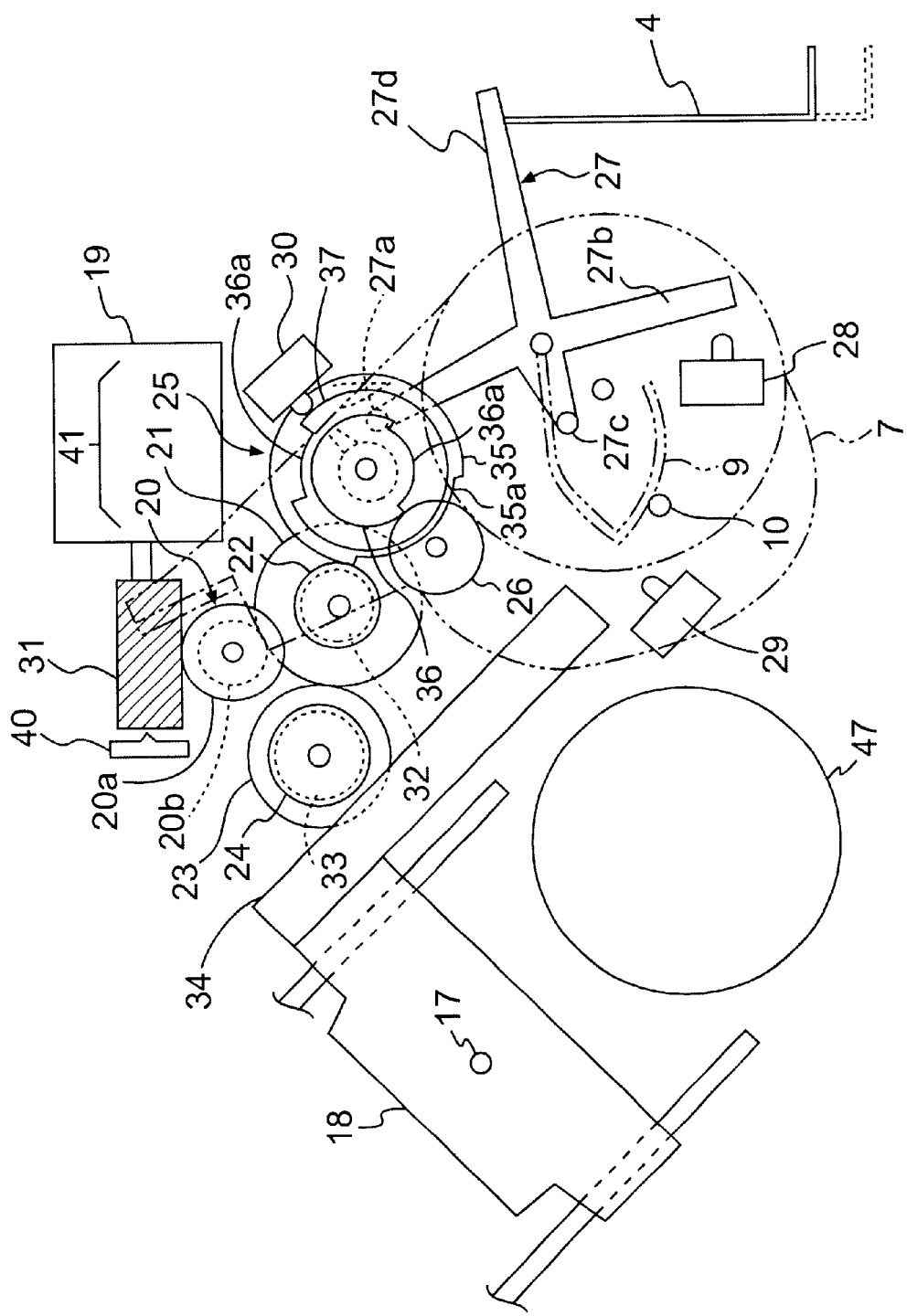
FIG. 11 is a plan view generally illustrating the transmission mechanism and associated parts in its surroundings in an ejecting operation.

Next, as the eject lever 4 is pushed in during a disc playing operation as illustrated in FIG. 11, the pushed portion 27d is pushed by the eject lever 4 to cause a pivotal movement of the holding mechanism 27 in the counter-clockwise direction, and the engaging portion 27a to come off the second engaged portion 39 and move onto the trajectory of the first engaged portion 38. Also, the switch operating portion 27b is moved away from the first control switch 28 to turn the switch 28 off, which causes the motor 19 to rotate fast in the reverse direction.

The engaging portion 27a comes off the second engaged portion 39 to bring the respective toothed portions of the toothless gears 35, 36 into mesh with the upstream gear 22 and the downstream gear 26, such that the reverse rotating force of the motor 19 is transmitted to the rack 34 through the gears 20, 21, 23, 24 and simultaneously transmitted to the larger gear 14 through the transmission mechanism 41.

Then, the larger gear 14 moves the cam member 51 toward the deepest position of the apparatus through the rack 54. In this event, the cam member 51 first lifts the abutment piece 53 by the middle stage 52b of the cam face 52 so as to slightly move the clamper 48 away from the turntable 47, and subsequently pushes up the abutment piece 53 by the upper stage 52a so as to sufficiently move the clamper 48 away from the turntable 47. Then, the circular arc cam 7a abuts to the triangular plate 51a to push back the cam member 51 to the deepest position and maintains the cam member 51 at the pushed-back position. The pivotal movement of the push-back member 7 in the counter-clockwise direction causes the push-back portion 16 to push back the disc 1 toward the disc insertion port 5. Then, the third control switch 30 is once turned on by the switch control cam plate 37 of the control gear 25; however, it is again turned off immediately before the first engaged portion 38 abuts to the engaging portion 27a to stop the control gear 25 so as to stop the motor 19.

On the other hand, the reverse rotating force of the motor 19 is transmitted to the pickup 17 through the gears 20, 21, 23, 24 and rack 34, which causes the pickup 17 to move toward the lead-in area of the disc 1. Then, when the pickup 17 reaches the lead-in area, the rack 34 switches the second control switch 29 from off to on.

The motor 19 for moving the pickup is continuously rotated until the third control switch 30 is switched off by the switch control cam plate 37 to complete an ejecting operation of the disc 1 by the push-back member 7. However, after the pickup 17 has reached the lead-in area, the pickup supporter 18 is forcedly restricted in movement, so that the removal of the disc 1 by the push-back member 7 is continued for completion while generating slippage between the gears 23, 24 and the friction plate 33.

If the movement of the push-back member 7 is forcedly interfered by an erroneous manipulation, a malicious manipulation or the like while the disc 1 is being pushed back by the push-back member 7, slippage is generated between the gears 21, 22 and the friction plate 32 to prevent the disc 1, the motor 19, and the like from damaging. Also, when the push-back member 7 is released from any forced interference, the disc removal operation is resumed by the push-back member 7 from that time, such that the disc 1 can be removed from the insertion port 5 without fail.

Figure 12:
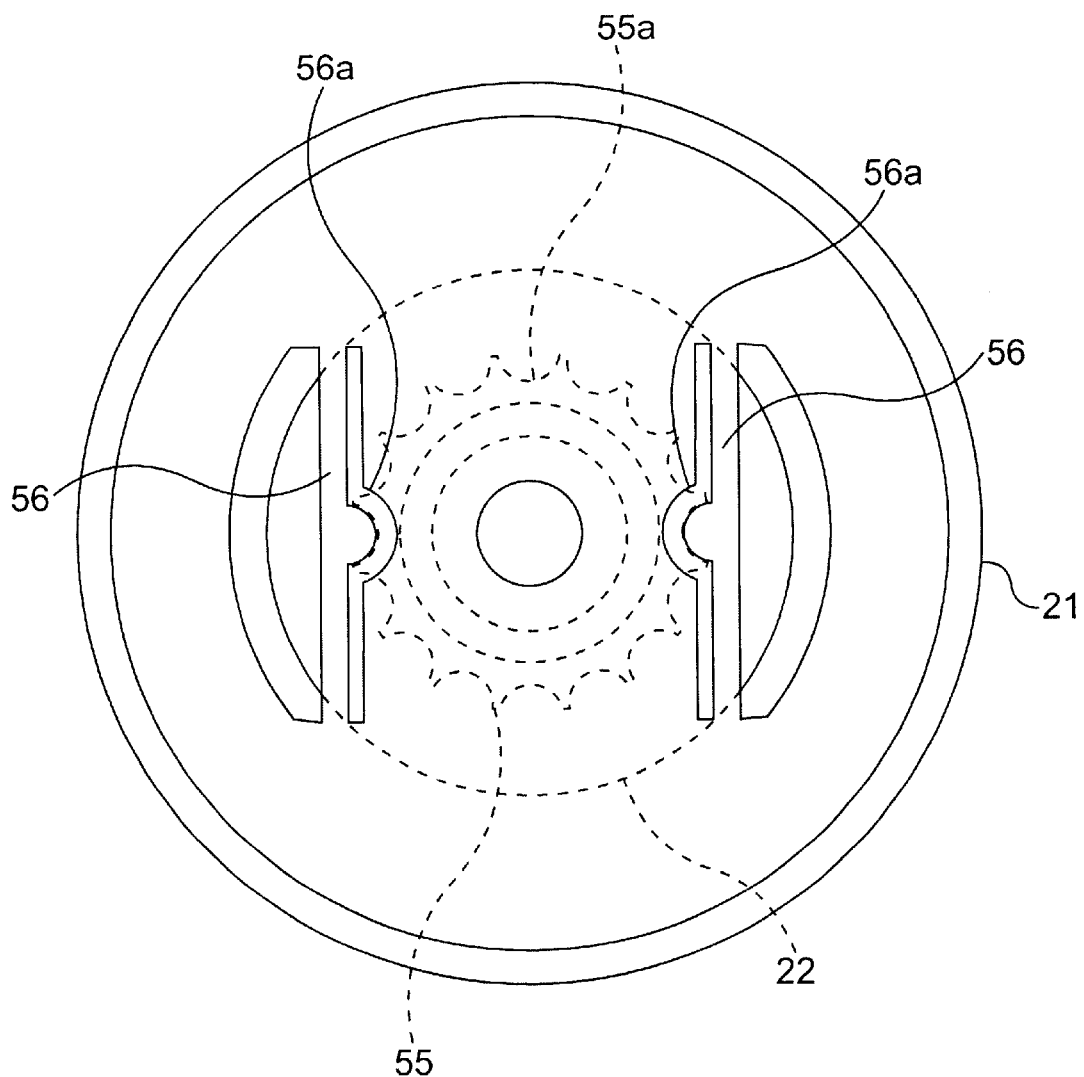
FIG. 12 is a plan view generally illustrating a sliding mechanism in a second embodiment of the present invention.

FIG. 12 illustrates a disc transfer apparatus according to a second embodiment of the present invention. Specifically, the first embodiment uses the friction plate 32 interposed between the two gears 21, 22 in the transmission mechanism 41 to provide a sliding mechanism which absorbs an overload through slippage, whereas the second embodiment has a substitute for this sliding mechanism while the other corresponding parts are designated with the same reference numerals. An upstream gear 22 interposed in a transmission mechanism 41 has an integral braking wheel 55 which is formed with a number of recesses 55a on the outer periphery. A gear 21 coaxial with the upstream gear 22 is provided with a pair of resilient sandwiching pieces or members 56 for resiliently sandwiching the braking wheel 55 in a radial direction. The resilient sandwiching pieces or members 56 are formed with rounded protrusions 56a which are fitted into the recesses 55a of the braking wheel 55.

With the foregoing structure, the gear 21 is rotated integrally with the upstream gear 22 before a load applied on the upstream gear 22 exceeds a set value. When the load on the upstream gear 22 exceeds the set value, the gear 21 alone is rotated while the braking wheel 55 slips between the resilient sandwiching pieces 56. Therefore, this structure can advantageously prevent the disc 1, motor 19, and the like from damaging by virtue of the slippage generated between the gears 21, 22 when the movement of the push-back member 7 is forcedly interfered.

Figure 13:
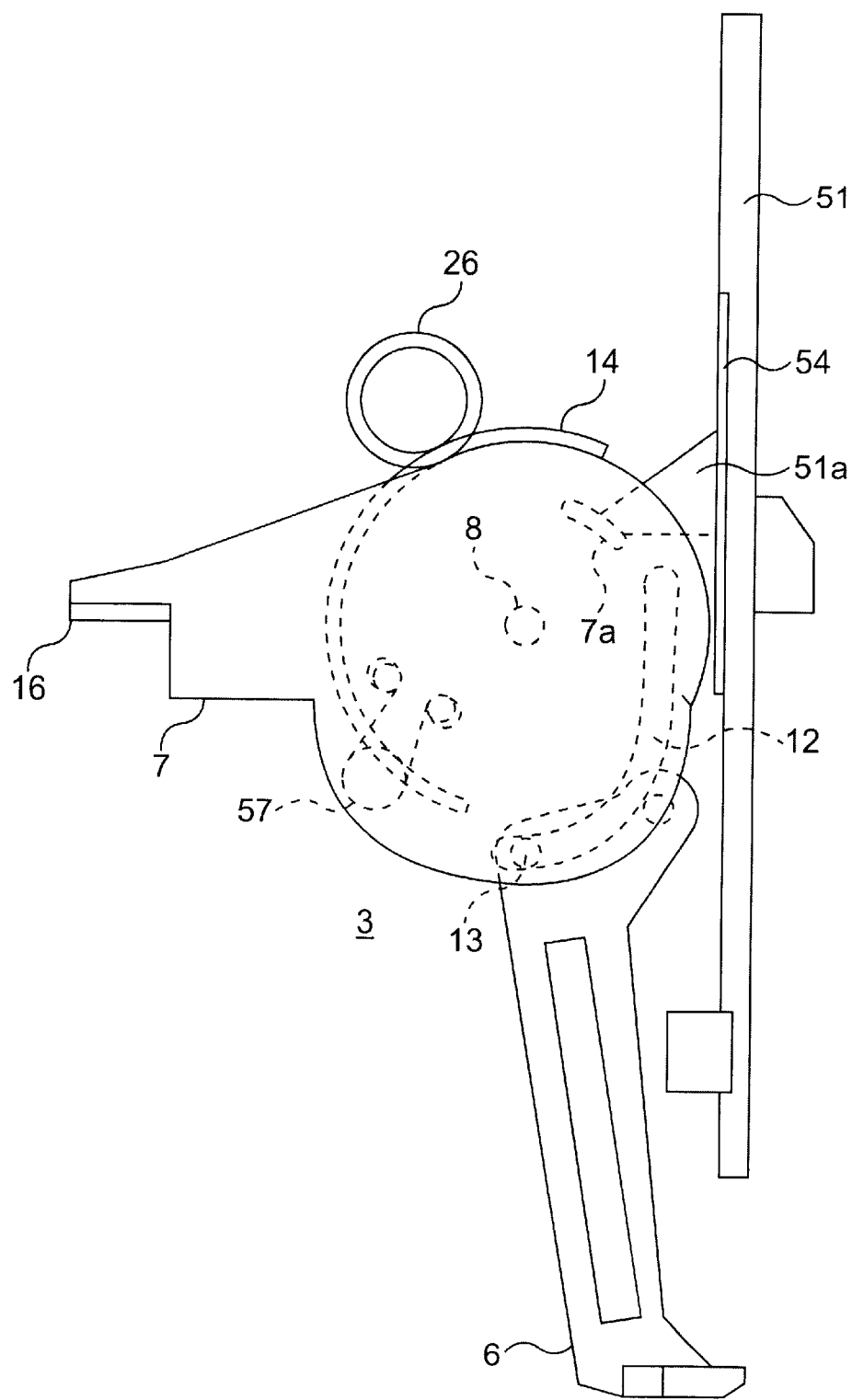
FIG. 13 is a plan view generally illustrating a toggle mechanism in a third embodiment of the present invention.

FIG. 13 illustrates a disc transfer apparatus according to a third embodiment of the present invention. Specifically, the first embodiment uses the toggle mechanism 11 which has the push-back member 7 formed with the angle cam 9 to which the cam follower 10 is resiliently pressed to urge the push-back member 7 for bidirectionally pivotal movements. In the third embodiment illustrated in FIG. 13, however, a toggle spring 57 is extended between the floating chassis 3 and the push-back member 7 to provide a toggle mechanism.

Likewise, with the foregoing structure, the disc 1, when inserted, pushes the push-back member 7 against the toggle spring 57. As the toggle spring 57 goes beyond a dead point, a resilient force of the toggle spring 57 causes a pivotal movement of the push-back member 7 at a stretch, which produces a similar effect to that of the first embodiment.

As described above, according to the present invention, in the disc transfer apparatus, a push-back member is coupled with a push-in member, the push-back member is bidirectionally urged by the toggle mechanism, and the power of the two-way motor for moving the pickup is transmitted to the push-back member through the transmission mechanism. The transmission mechanism includes a control gear, and an upstream gear and a downstream gear in mesh with the control gear on the upstream and downstream sides, respectively. When a disc is inserted into a player, the control gear is released from meshing with the upstream gear and downstream gears by a holding mechanism so that the disc is inserted with a spring force. The disc is removed by the power of the motor with the control gear brought into mesh with the upstream and downstream gears. Thus, the disc can be lightly inserted without a load of the motor.

Particularly, the control gear is comprised of two coaxial, integral toothless gears, and these toothless gears are simultaneously placed opposite to the upstream and downstream gears, respectively, thereby resulting in a simplified structure.

The structure can be further simplified by forming the push-back member with the angle cam to which the cam follower is resiliently pressed to provide the toggle mechanism. Alternatively, a toggle spring may be used for the toggle mechanism.

In the apparatus adapted to control movements of the chucking mechanism into contact with and away from the turntable by a cam member which is reciprocally movably associated with pivotal movements of the push-back member, the cam member is provided with a plurality of steps on the cam face such that the chucking mechanism is moved step by step into contact with and away from the turntable so as to prevent a shock in a chucking operation.

Further, the sliding mechanism interposed in the transmission path for absorbing an overload can prevent the motor for moving the pickup or the like from damaging even if the removal of a disc is forcedly stopped.

The principles, preferred embodiments and modes of operation of the present invention have been described in the foregoing specification. However, the invention which is intended to be protected is not limited to the particular embodiments disclosed. The embodiments described herein are illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A disc transfer apparatus, comprising:
   a push-back member arranged to be pivotally moved in one direction for pushing a disc toward a disc insertion port when the disc is at a playing position;
   a push-in member coupled to the push-back member, the push-in member for being moved toward a waiting position at which the disc is inserted when the push-back member moves pivotally in said one direction, with the push-in member responding to a pivotal movement of the push-back member in an opposite direction to said one direction by the push-in member pivotally moving in said opposite direction to push the disc into the playing position;
   a toggle mechanism for urging the push-back member to be selectively pivotally moved in said one direction and in said opposite direction from a neutral position of the toggle mechanism;
   a motor for generating power for selectively moving a pickup and for selectively moving the push-back member;
   a transmission mechanism providing a power transmission path for selectively transmitting power generated by the motor to the push-back member, the transmission mechanism for selectively pivotally moving the push-back member in said one direction, the transmission mechanism including a control gear, and an upstream gear and a downstream gear selectively in mesh with the control gear in an upstream and in a downstream of the power transmission path, respectively;
   a holding mechanism for holding the control gear from meshing with the upstream gear and the downstream gear when the push-back member is pivotally moved in said opposite direction; and
   ejecting means for releasing the control gear from the holding mechanism to thereby bring the control gear into mesh with the upstream gear and the downstream gear for transmitting the power generated by the motor to the push-back member to pivotally move the push-back member in said one direction.

2. The disc transfer apparatus according to claim 1, wherein:
   the control gear includes two coaxially integrated toothless gears, and toothless portions of the respective toothless gears are simultaneously placed in facing relation to the upstream gear and the downstream gear, respectively, by the holding mechanism.

3. The disk transfer apparatus according to claim 2, wherein:
   the motor comprises a two-way motor.

4. The disc transfer apparatus according to claim 1, further comprising:
   a sliding mechanism interposed in the power transmission path for absorbing an overload of the power generated by the motor by generating slippage within the transmission mechanism.

5. The disk transfer apparatus according to claim 1, wherein:
   the motor comprises a two-way motor.

6. A disc transfer apparatus, comprising:
   a push-back member arranged to be pivotally moved in one direction for pushing a disc toward a disc insertion port when the disc is at a playing position;
   a push-in member coupled to the push-back member, the push-in member for being moved toward a waiting position at which the disc is inserted when the push-back member moves pivotally in said one direction, with the push-in member responding to a pivotal movement of the push-back member in an opposite direction to said one direction by the push-in member pivotally moving in said opposite direction to push the disc into the playing position;
a toggle mechanism for urging the push-back member to be selectively pivotally moved in said one direction and in said opposite direction from a neutral position of the toggle mechanism, the toggle mechanism including an angle cam formed on the push-back member, the angle cam including a pair of sides extending from a peak of the angle cam, with an incline on each of the pair of sides, and a cam follower resiliently pressed onto the angle cam, with the cam follower selectively pressing the incline on a corresponding one of the pair of sides from the neutral position of the toggle mechanism, to urge the push-back member for selectively bi-directionally pivotally moving the push-back member in said one direction and in said opposite direction, the neutral position of the toggle mechanism being a position at which the cam follower is in contact with the peak of the angle cam;
a motor for generating power for selectively moving a pickup and for selectively moving the push-back member;
a transmission mechanism providing a power transmission path for selectively transmitting power generated by the motor to the push-back member, the transmission mechanism for selectively pivotally moving the push-back member in said one direction, the transmission mechanism including a control gear, and an upstream gear and a downstream gear selectively in mesh with the control gear in an upstream and in a downstream of the power transmission path, respectively;
a holding mechanism for holding the control gear from meshing with the upstream gear and the downstream gear when the push-back member is pivotally moved in said opposite direction; and
ejecting means for releasing the control gear from the holding mechanism to thereby bring the control gear into mesh with the upstream gear and the downstream gear for transmitting the power generated by the motor to the push-back member to pivotally move the push-back member in said one direction.

7. The disk transfer apparatus according to claim 6, wherein:
the motor comprises a two-way motor.

8. The disc transfer apparatus according to claim 6, wherein:
the control gear includes two coaxially integrated toothless gears, and toothless portions of the respective toothless gears are simultaneously placed in facing relation to the upstream gear and the downstream gear, respectively, by the holding mechanism.

9. The disc transfer apparatus according to claim 8, further comprising:
a cam member reciprocally movably associated with corresponding pivotal movement of the push-back member for selectively controlling an operation of a chucking mechanism into contact with and away from a turntable, and
wherein the cam member includes a cam face, the cam face including a plurality of steps, the plurality of steps of the cam face for selectively moving the chucking mechanism into contact with and away from the turntable on a step-by-step basis by the chucking mechanism selectively contacting a corresponding one of the plurality of steps of the cam face.

10. The disc transfer apparatus according to claim 9, further comprising:
a sliding mechanism interposed in the power transmission path for absorbing an overload of the power generated by the motor by generating slippage within the transmission mechanism.

11. The disc transfer apparatus according to claim 6, further comprising:
a cam member reciprocally movably associated with corresponding pivotal movement of the push-back member for selectively controlling an operation of a chucking mechanism into contact with and away from a turntable, and
wherein the cam member includes a cam face, the cam face including a plurality of steps, the plurality of steps of the cam face for selectively moving the chucking mechanism into contact with and away from the turntable on a step-by-step basis by the chucking mechanism selectively contacting a corresponding one of the plurality of steps of the cam face.

12. The disc transfer apparatus according to claim 6, further comprising:
a sliding mechanism interposed in the power transmission path for absorbing an overload of the power generated by the motor by generating slippage within the transmission mechanism.

13. A disc transfer apparatus, comprising:
a push-back member arranged to be pivotally moved in one direction for pushing a disc toward a disc insertion port when the disc is at a playing position;
a push-in member coupled to the push-back member, the push-in member for being moved toward a waiting position at which the disc is inserted when the push-back member moves pivotally in said one direction, with the push-in member responding to a pivotal movement of the push-back member in an opposite direction to said one direction by the push-in member pivotally moving in said opposite direction to push the disc into the playing position;
a toggle mechanism for urging the push-back member to be selectively pivotally moved in said one direction and in said opposite direction from a neutral position of the toggle mechanism;
a motor for generating power for selectively moving a pickup and for selectively moving the push-back member;
a transmission mechanism providing a power transmission path for selectively transmitting power generated by the motor to the push-back member, the transmission mechanism for selectively pivotally moving the push-back member in said one direction, the transmission mechanism including a control gear, and an upstream gear and a downstream gear selectively in mesh with the control gear in an upstream and in a downstream of the power transmission path, respectively;
a holding mechanism for holding the control gear from meshing with the upstream gear and the downstream gear when the push-back member is pivotally moved in said opposite direction;
ejecting means for releasing the control gear from the holding mechanism to thereby bring the control gear into mesh with the upstream gear and the downstream gear for transmitting the power generated by the motor to the push-back member to pivotally move the push-back member in said one direction; and a floating chassis, and wherein the toggle mechanism includes a toggle spring extending between the push-back member and the floating chassis, the toggle spring for providing a resilient force for selective pivotal movement of the push-back member.

14. The disk transfer apparatus according to claim 13, wherein:

the motor comprises a two-way motor.

15. A disc transfer apparatus, comprising:

a push-back member arranged to be pivotally moved in one direction for pushing a disc toward a disc insertion port when the disc is at a playing position;

a push-in member coupled to the push-back member, the push-in member for being moved toward a waiting position at which the disc is inserted when the push-back member moves pivotally in said one direction, with the push-in member responding to a pivotal movement of the push-back member in an opposite direction to said one direction by the push-in member pivotally moving in said opposite direction to push the disc into the playing position;

a toggle mechanism for urging the push-back member to be selectively pivotally moved in said one direction and in said opposite direction from a neutral position of the toggle mechanism;

a motor for generating power for selectively moving a pickup and for selectively moving the push-back member;

a transmission mechanism providing a power transmission path for selectively transmitting power generated by the motor to the push-back member, the transmission mechanism for selectively pivotally moving the push-back member in said one direction, the transmission mechanism including a control gear, and an upstream gear and a downstream gear selectively in mesh with the control gear in an upstream and in a downstream of the power transmission path, respectively;

a holding mechanism for holding the control gear from meshing with the upstream gear and the downstream gear when the push-back member is pivotally moved in said opposite direction;

ejecting means for releasing the control gear from the holding mechanism to thereby bring the control gear into mesh with the upstream gear and the downstream gear for transmitting the power generated by the motor to the push-back member to pivotally move the push-back member in said one direction; and a cam member reciprocally movably associated with corresponding pivotal movement of the push-back member for selectively controlling an operation of a chucking mechanism into contact with and away from a turntable, and wherein the cam member includes a cam face, the cam face including a plurality of steps, the plurality of steps of the cam face for selectively moving the chucking mechanism into contact with and away from the turntable on a step-by-step basis by the chucking mechanism selectively contacting a corresponding one of the plurality of steps of the cam face.

16. The disk transfer apparatus according to claim 15, wherein:

the motor comprises a two-way motor.

17. The disc transfer apparatus according to claim 15, further comprising:

a floating chassis, and wherein the toggle mechanism includes a toggle spring extending between the push-back member and the floating chassis, the toggle spring for providing a resilient force for selective pivotal movement of the push-back member.

18. The disc transfer apparatus according to claim 15, further comprising:

a sliding mechanism interposed in the power transmission path for absorbing an overload of the power generated by the motor by generating slippage within the transmission mechanism.

19. The disc transfer apparatus according to claim 15, wherein:

the control gear includes two coaxially integrated toothless gears, and toothless portions of the respective toothless gears are simultaneously placed in facing relation to the upstream gear and the downstream gear, respectively, by the holding mechanism.

20. A disc transfer apparatus, comprising:

a push-back member arranged to be pivotally moved in one direction for pushing a disc toward a disc insertion port when the disc is at a playing position;

a push-in member coupled to the push-back member, the push-in member for being moved toward a waiting position at which the disc is inserted when the push-back member moves pivotally in said one direction, with the push-in member responding to a pivotal movement of the push-back member in an opposite direction to said one direction by the push-in member pivotally moving in said opposite direction to push the disc into the playing position;

a toggle mechanism for urging the push-back member to be selectively pivotally moved in said one direction and in said opposite direction from a neutral position of the toggle mechanism;

a motor for generating power for selectively moving a pickup and for selectively moving the push-back member;

a transmission mechanism providing a power transmission path for selectively transmitting power generated by the motor to the push-back member, the transmission mechanism for selectively pivotally moving the push-back member in said one direction, the transmission mechanism including a control gear, and an upstream gear and a downstream gear selectively in mesh with the control gear in an upstream and in a downstream of the power transmission path, respectively;

a holding mechanism for holding the control gear from meshing with the upstream gear and the downstream gear when the push-back member is pivotally moved in said opposite direction;

ejecting means for releasing the control gear from the holding mechanism to thereby bring the control gear into mesh with the upstream gear and the downstream gear for transmitting the power generated by the motor to the push-back member to pivotally move the push-back member in said one direction; and a sliding mechanism interposed in the power transmission path for absorbing an overload of the power generated by the motor by generating slippage within the trans mission mechanism, the sliding mechanism comprising a gear in the transmission mechanism including a braking wheel with a plurality of recesses and a gear including a pair of resilient members with a plurality of protrusions for engaging with the plurality of recesses of the braking wheel.

21. The disk transfer apparatus of claim 20, wherein:
the gear in the transmission mechanism that includes the braking wheel is the upstream gear.

22. The disk transfer apparatus according to claim 21, wherein:
the motor comprises a two-way motor.

23. The disk transfer apparatus according to claim 20, wherein:
the motor comprises a two-way motor.

* * * * *